United States Patent
Pan

(10) Patent No.: US 10,877,562 B2
(45) Date of Patent: Dec. 29, 2020

(54) MOTION DETECTION SYSTEM, MOTION DETECTION METHOD AND COMPUTER-READABLE RECORDING MEDIUM THEREOF

(71) Applicant: HTC Corporation, Taoyuan (TW)

(72) Inventor: Sheng-Yang Pan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/191,459

(22) Filed: Nov. 15, 2018

(65) Prior Publication Data

US 2019/0272034 A1 Sep. 5, 2019

Related U.S. Application Data

(60) Provisional application No. 62/637,406, filed on Mar. 2, 2018.

(51) Int. Cl.
*G06F 3/01* (2006.01)
*G06F 3/0346* (2013.01)
*G06N 20/00* (2019.01)

(52) U.S. Cl.
CPC ............ *G06F 3/016* (2013.01); *G06F 3/0346* (2013.01); *G06F 3/011* (2013.01); *G06N 20/00* (2019.01)

(58) Field of Classification Search
None
See application file for complete search history.

(56) References Cited

U.S. PATENT DOCUMENTS

| 8,077,020 | B2* | 12/2011 | Behm | A61H 3/061 |
| | | | | 135/911 |
| 2015/0170023 | A1* | 6/2015 | Chatterjee | G06N 3/08 |
| | | | | 706/16 |
| 2016/0195930 | A1* | 7/2016 | Venkatesan | A63F 13/42 |
| | | | | 345/156 |
| 2016/0378186 | A1* | 12/2016 | Kim | G06F 3/016 |
| | | | | 345/156 |

FOREIGN PATENT DOCUMENTS

| CN | 106155306 | 11/2016 |
| CN | 107479708 | 12/2017 |
| CN | 107667330 | 2/2018 |

OTHER PUBLICATIONS

"Office Action of Taiwan Counterpart Application", dated Mar. 6, 2020, p. 1-p. 7.

* cited by examiner

*Primary Examiner* — Christopher J Kohlman
(74) *Attorney, Agent, or Firm* — JCIPRNET

(57) ABSTRACT

A motion detection system, a motion detection method and a computer-readable recording medium thereof are provided. The motion detection system includes one or more haptic feedback devices and a motion sensor. The haptic feedback devices are equipped with one or more haptic feedback elements. The haptic feedback elements are configured to perform a haptic feedback. The haptic feedback elements are triggered to perform a haptic feedback according to a haptic feedback command. A detection value from the motion sensor is modified in response to the haptic feedback elements being triggered by the haptic feedback command. Accordingly, the precision for positioning the haptic feedback devices can be improved.

20 Claims, 8 Drawing Sheets

MOTION DETECTION SYSTEM, MOTION DETECTION METHOD AND COMPUTER-READABLE RECORDING MEDIUM THEREOF

CROSS-REFERENCE TO RELATED APPLICATION

This application claims the priority benefit of U.S. provisional application Ser. No. 62/637,406, filed on Mar. 2, 2018. The entirety of the above-mentioned patent application is hereby incorporated by reference herein and made a part of this specification.

BACKGROUND OF THE DISCLOSURE

1. Field of the Disclosure

The present disclosure relates to a method for positioning a haptic feedback device, and more particularly, relates to a motion detection system, a motion detection method and a computer-readable recording medium thereof for a haptic feedback device.

2. Description of Related Art

Technologies for simulating senses, perception and/or environment, such as virtual reality (VR), augmented reality (AR) or mixed reality (MR), are popular nowadays. The aforementioned technologies can be applied in multiple fields, such as gaming, military training, healthcare, remote working, etc. In order to let the user perceive the simulated environment as a real environment, location of the user or operating hand in the space should be obtained, so that the displaying image on a VR, AR or MR display can be changed in response to the location of the user or the operating hand. For example, a VR product may include a handheld controller and a display, the location of the handheld controller would be tracked, and a behavior of an operating hand of the user in the displaying image of the display can be moved in response to the tracked location of the handheld controller. It should noticed that the handheld controller may be equipped with haptic feedback elements to recreate the sense of touch. The haptic feedback elements can enhance sense of reality and immersion in the simulated environment.

SUMMARY OF THE DISCLOSURE

Accordingly, the present disclosure is directed to a motion detection system, a motion detection method and a computer-readable recording medium thereof, which compensates positioning error influenced by haptic feedback elements, so as to improve positioning result for a haptic feedback device.

In one of the exemplary embodiments, the motion detection system at least includes, but not limited to, one or more haptic feedback devices and a motion sensor. The haptic feedback devices are equipped with one or more haptic feedback elements, where the haptic feedback elements are configured to perform a haptic feedback. The haptic feedback elements are triggered to perform the haptic feedback according to the haptic feedback command, and a detection value from the motion sensor is modified in response to the haptic feedback elements being triggered by the haptic feedback command.

According to one of the exemplary embodiments, the detection value is modified according to a compensating command, and the compensating command is used for indicating a modification of the detection value corresponding to a content of the haptic feedback command.

According to one of the exemplary embodiments, the compensating command includes a compensating value for modifying the detection value, and the compensating value is determined according to a lookup table, wherein the lookup table records a relation between the compensating value and the content of the haptic feedback command.

According to one of the exemplary embodiments, at least one value influenced by the motion of the haptic feedback elements is filtered from the detection value with a range so as to modify the detection value.

According to one of the exemplary embodiments, the compensating command includes a compensating value for compensating the detection value, and the compensating value is determined by a compensating model, wherein the compensating model is established by a machine learning technology.

According to one of the exemplary embodiments, the haptic feedback devices includes the motion sensor, and the motion sensor includes an inertial sensor, and an output of the inertial sensor is modified in response to the haptic feedback elements being triggered by the haptic feedback command so as to modify the detection value.

According to one of the exemplary embodiments, the haptic feedback devices includes a first haptic feedback device and a second haptic feedback device, and the motion detection system further includes a processor. The processor is configured to determine at least one of the first haptic feedback device and the second haptic feedback device to perform the haptic feedback. The detection value from the motion sensor is modified by a filter in response to a determination that the second haptic feedback device performs the haptic feedback. The detection value from the motion sensor is modified by a machine learning model or a compensating command in response to a determination that the first haptic feedback device performs the haptic feedback.

According to one of the exemplary embodiments, the motion detection system further includes a processor. The processor is configured to generate the haptic feedback command and accordingly perform a modification to modify the detection value.

According to one of the exemplary embodiments, the motion sensor is an accelerometer. An output of the accelerometer is modified in response to the haptic feedback elements being triggered by the haptic feedback command so as to modify the detection value.

According to one of the exemplary embodiments, the processor is independent from the haptic feedback devices and modifies the detection value received from the motion sensor according to a compensating command or the processor is mounted in the haptic feedback devices.

In one of the exemplary embodiments, the motion detection method, which is adapted for a motion detection system including one or more haptic feedback devices equipped with one or more haptic feedback elements and a motion sensor, is provided. The motion detection method includes the following steps. Triggering the haptic feedback elements to perform a haptic feedback according to a haptic feedback command. Modifying a detection value from the motion sensor in response to the haptic feedback elements being triggered by the haptic feedback command.

In one of the exemplary embodiments, the non-transitory computer readable recording medium records computer program to be loaded by a processor to execute the aforementioned method.

To make the above features and advantages of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
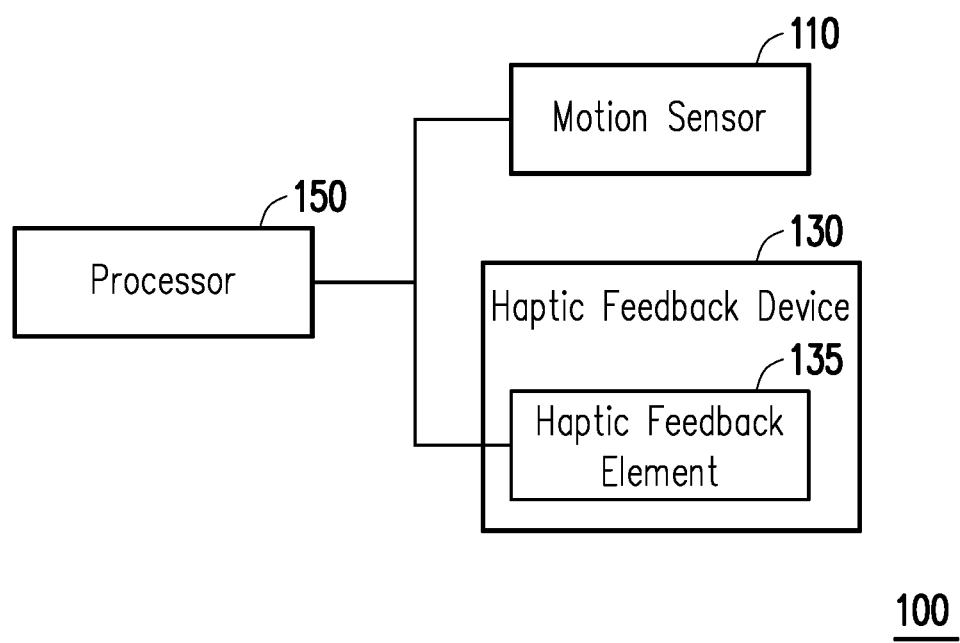
FIG. 1 is a block diagram illustrating a motion detection system according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Referring to FIG. 1, FIG. 1 is a block diagram illustrating a motion detection system 100 according to one of the exemplary embodiments of the disclosure. The motion detection system 100 at least includes, but not limited to, a motion sensor 110, one or more haptic feedback devices 130 and a processor 150. The motion detection system 100 is adapted for virtual reality (VR), augmented reality (AR), mixed reality (MR) or other reality technology.

The motion sensor 110 includes an accelerometer, a gyroscope, a magnetometer, a laser sensor, an infrared ray (IR) sensor, an image sensor, or any combination of aforementioned sensors.

The haptic feedback device 130 is a controller (such as a gamepad, a light gun, a joystick or other game controllers), which may be equipped with input device (such as a button, a touch sensor, a stick, a switch, etc.) for receiving operation (such as press, touch, or slide operation, etc.) of hand. The haptic feedback device 130 may be embedded in a haptic feedback clothing (such as shirt, pants, jacket, etc.)). In addition, the haptic feedback device 130 is equipped with one or more haptic feedback elements 135 (such as Power-Hap piezo actuator, electroactive polymer (EAP) actuator, shape memory alloy (SMA) actuator, magnetostrictive actuator, voice coil motor actuator, linear-resonance actuator (LRA), electromagnetic actuator, or other haptic actuators). The haptic feedback elements 135 can perform a haptic feedback behavior such as vibration, force feedback, or shake.

The processor 150 is directly or indirectly electrically or wirelessly connected to the motion sensor 110 and the haptic feedback elements 135. The processor 150 may be implemented by using a programmable unit, such as a central processing unit (CPU), a micro-processor, a micro-controller, a digital signal processing (DSP) chip, a field programmable gate array (FPGA), and so on. The function of the processor 150 may also be implemented by an independent electronic device or an integrated circuit (IC), and the operation of the processor 150 may also be implemented by software. The processor 150 is programmed to execute the functions or steps that would be described below.

Figure 2A:
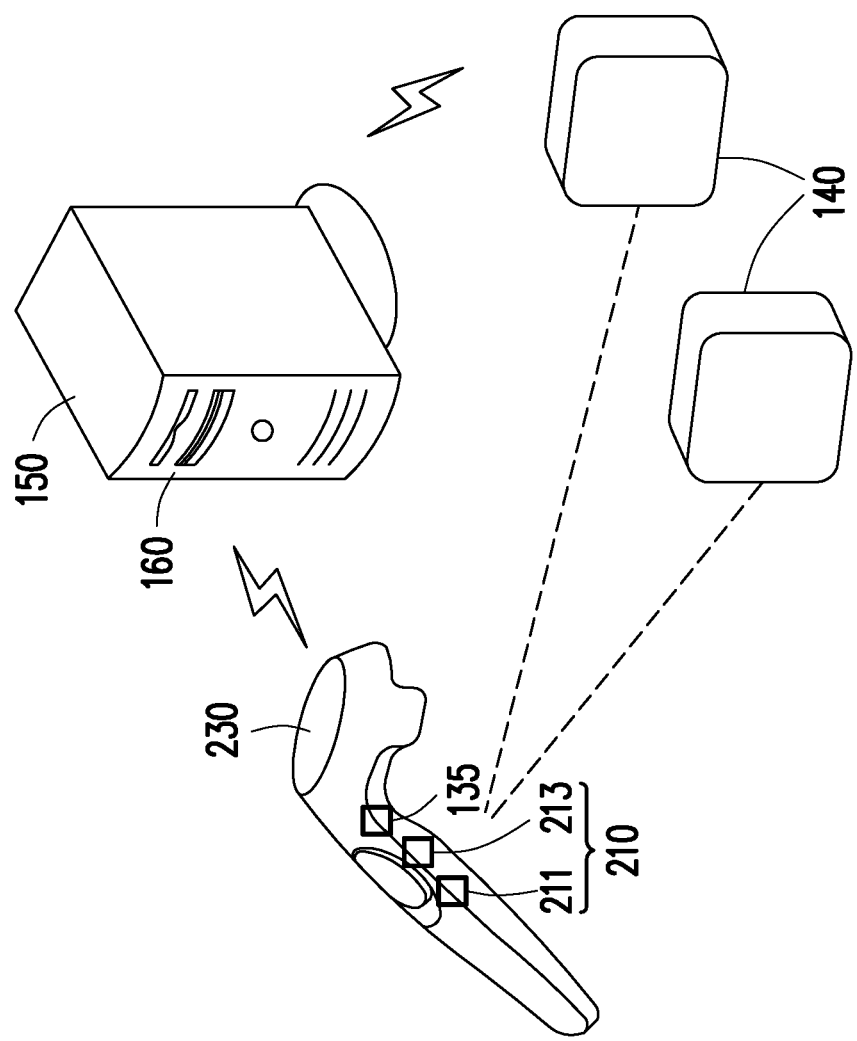
FIG. 2A is a schematic diagram illustrating a motion detection system according to one of the exemplary embodiments of the disclosure.

The motion detection system 100 is used for movement detection, positioning detection or motion detection of object (such as the haptic feedback device 130, a part of human body, etc.), so as to detect position variation of the object relative to surrounds. The result of the motion detection could further be reference information for positioning computation. For example, FIG. 2A is a schematic diagram illustrating a motion detection system 200 according to one of the exemplary embodiments of the disclosure. In this embodiment, the processor 150 is embedded in a computation device 160 (such as a computer, a server, a smart phone, etc.) and independent from the haptic feedback device 230. The motion sensors 210 includes an inertial sensor 211 (such as an accelerometer or/and a gyroscope) and a photosensitive sensors 213 (such as a laser sensor, an infrared ray (IR) sensor, or/and an image sensor). The computation device 160 and the haptic feedback device 230 (which is a handheld controller in this embodiment) can communicate with each other by using a compatible communication transceiver (supporting Wi-Fi, Bluetooth, or the like). Two light emitters 140 emit lights. The motion sensors 210 are used to detect the motion of the haptic feedback device 230, wherein the photosensitive sensors 213 detects the lasers from the light emitters 140, and the accelerometer 211 detects the acceleration or/and the angular velocity of the haptic feedback device 230. The processor 150 can receive the detection values of the inertial sensor 211 and the photosensitive sensors 213. The processor 150 determines a positioning information (such as coordinates in 3-dimension space, a relative position corresponding to the light emitters 140, etc.) of the haptic feedback device 230 in a space according to the detection value from the motion sensor 210, where the detection value of the inertial sensor 211 is used for correcting the positioning information.

It should be noticed that, in other embodiments, the photosensitive sensors 213 may be separated from the haptic feedback device 230, and the light emitters 140 are equipped on the haptic feedback device 230.

Figure 2B:
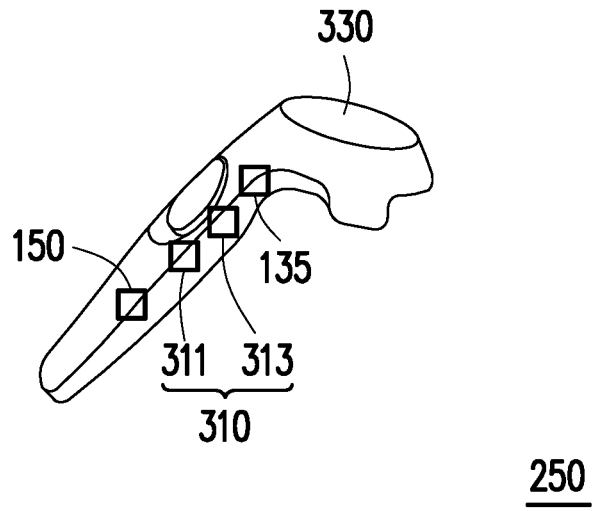
FIG. 2B is a schematic diagram illustrating a motion detection system according to one of the exemplary embodiments of the disclosure.

FIG. 2B is a schematic diagram illustrating a motion detection system 250 according to one of the exemplary embodiments of the disclosure. In this embodiment, the processor 150 is embedded in a haptic feedback device 330. In addition, the motion sensor 310 includes an IR sensor 311 and an inertial sensor (such as a 6-axis motion tracker including 3-axis accelerometer and 3-axis gyroscope) 313. The IR sensor 311 detects IR from outside, and the inertial sensor 313 detects the acceleration, the orientation, and the angular velocity of the haptic feedback device 330. The processor 150 can receive the detection values of the motion sensor 310 through a transmission interface (such as USB, I2C, UART, etc.), to determine the positioning information of the haptic feedback device 330. Accordingly, the motion sensor 110 and/or the processor 150 can be separated from or integrated with the haptic feedback device 130.

It should be noticed that, in other embodiments, the IR sensor 311 may be separated from the haptic feedback device 330, and an IR emitter may be equipped on the haptic feedback device 330. However, there may be many modifications for disposing the motion sensors 110, 210 and 310 and processor 150, and the embodiments is not limited thereto. In addition, based on different positioning mechanisms, the type and number of the motion sensors 110, 210 and 310 could be different, and the embodiments of the disclosure are not limited thereto.

In order to make the operation process of the embodiment of the disclosure more comprehensible, several embodiments are provided below to describe in detail the operations of the motion detection systems 100, 200 and 250 in the embodiment of the disclosure.

Figure 3:
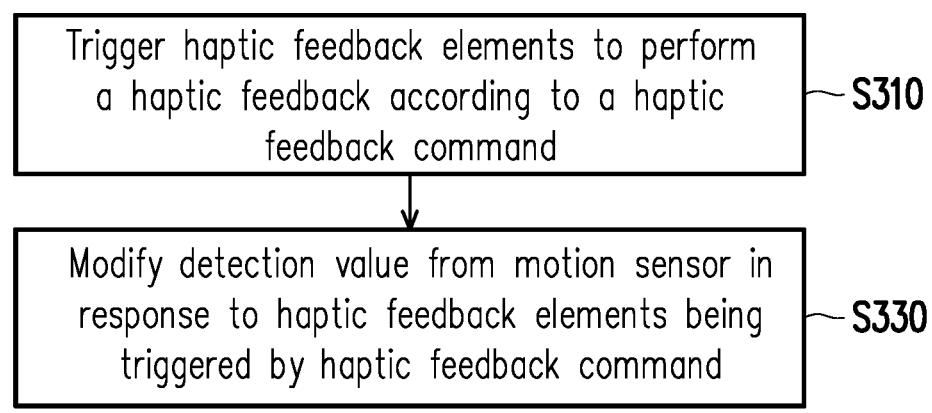
FIG. 3 is a flowchart illustrating a motion detection method according to one of the exemplary embodiments of the disclosure.

FIG. 3 is a flowchart of a motion detection method according to one of exemplary embodiments of the disclosure. Referring to FIG. 3, the motion detection method of this embodiment is adapted for the motion detection systems 100, 200 and 250 of FIGS. 1, 2A and 2B. For ease of description, in the following paragraphs, the motion detection method of this embodiment of the disclosure is described with reference to the components of the motion detection system 100, and the motion detection method for the motion detection systems 200 and 250 can be applicable thereto. Nevertheless, the processes of this motion detection method may be adjusted according to the actual needs and thus are not limited to the following.

When the processor 150 detects some haptic feedback events, for example, the haptic feedback device 130 has an interaction (such as touch, hold, grip, tap, etc.) with virtual object(s) in simulated environment, the processor 150 generates a haptic feedback command. The haptic feedback command is used to trigger the haptic feedback elements 135 to perform the haptic feedback such as vibration, force feedback, or shake.

The processor 150 would transmit the haptic feedback command to the haptic feedback elements 135, and the haptic feedback elements 135 would be triggered to perform the haptic feedback according to the haptic feedback command (Step S310). Then, in response to the haptic feedback elements 135 being triggered by the haptic feedback command, the processor 150 generates a compensating command for indicating a modification of the detection value from the motion sensor 110. Alternatively, the processor 150 compensates the received detection value from the motion sensor 110 (e.g., an output of the inertial sensor 211). Then, the detection value from the motion sensor 110 would be modified in response to the haptic feedback elements 135 being triggered by the haptic feedback command (Step S330). Because the motion of the haptic feedback elements 135, such as vibrations, may affect the detection value from the motion sensor 110, the positioning information of the haptic feedback device determined based on the detection value from the motion sensor 110 may be affected associated with the motion of the haptic feedback elements 135. Accordingly, the processor 150 activates a compensating mechanism for the positioning information when the haptic feedback device 130 receives the haptic feedback command.

It should be noticed that, in the case that the compensating command is transmitted to the haptic feedback device 130, the compensated detection value would be sent back to the processor 150, and the compensated detection value would be used for positioning computation. In the other case that the processor 150 can receive the original detection value from the motion sensor 110 and modifies it. The modified detection value would then be used for positioning computation.

There are many compensating mechanisms for the positioning information. The motion sensor 110 generates detection value according to the motion of the haptic feedback device 130, and the detection value is also influenced by the motion of the haptic feedback elements 135. In one embodiment, the detection value from the motion sensor 110 would be compensated, so that the position information of the haptic feedback device 150 is modified accordingly.

The motion of the haptic feedback elements 135 may result in a variation on the detection value from the motion sensor 110 (i.e. detection value of the motion of the haptic feedback device 110). In one embodiment, the processor 150 may eliminate the value influenced by the motion of the haptic feedback elements 135 from the detection value of the motion sensor 110.

There are many methods for determining a compensating value included in the compensating command for the detection value or determining a compensating value for directly compensating the detection value. In one embodiment, the processor 150 may determine the compensating value according to a lookup table. The lookup table records a relation between the compensating value and content of the haptic feedback command. Specifically, different contents of the haptic feedback command (such as haptic feedback for touching object, hitting a baseball, gun knockback, etc.) may cause different motions of the haptic feedback elements 135. Meanwhile, the different motions caused by the haptic feedback elements 135 may also cause different effect on the detection values from the motion sensor 110. Therefore, the compensating value is a prediction value of the value influenced by the motion of the haptic feedback elements 135, and the compensating value for each content of the haptic feedback command is measured and recorded in advance, to establish the lookup table or a function. The function is taking content of the haptic feedback command as an input and outputs a corresponding compensating value. The processor 150 can determine the content of currently generating haptic feedback command, and the lookup table or the function can output the compensating value for compensating the detection value from the motion sensor 110.

Figure 4:
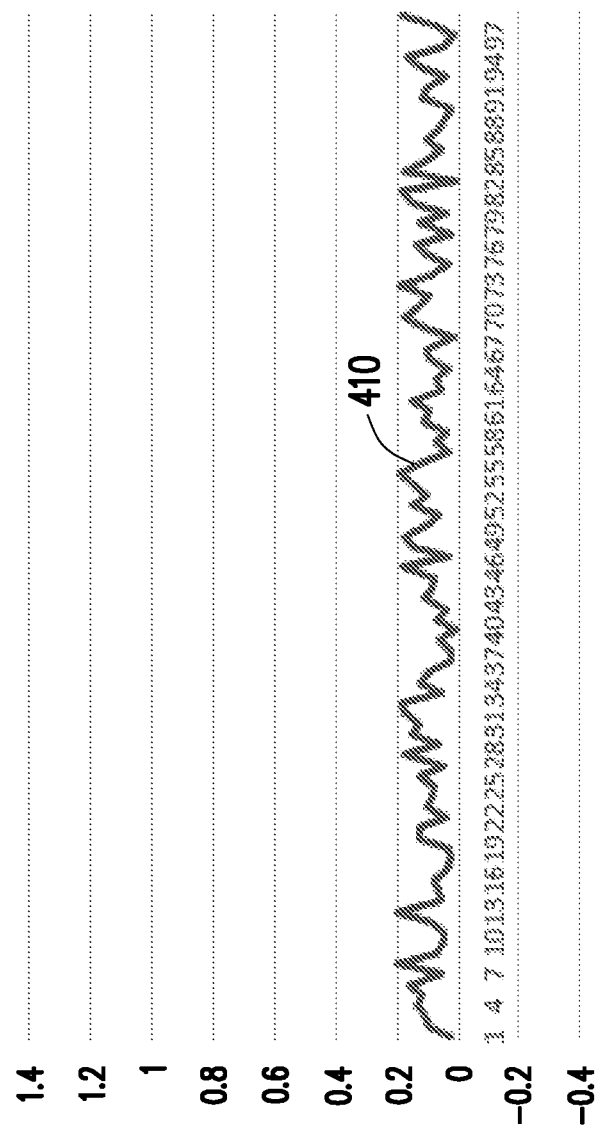
FIG. 4 is an example illustrating detection values of an accelerometer.
Figure 5:
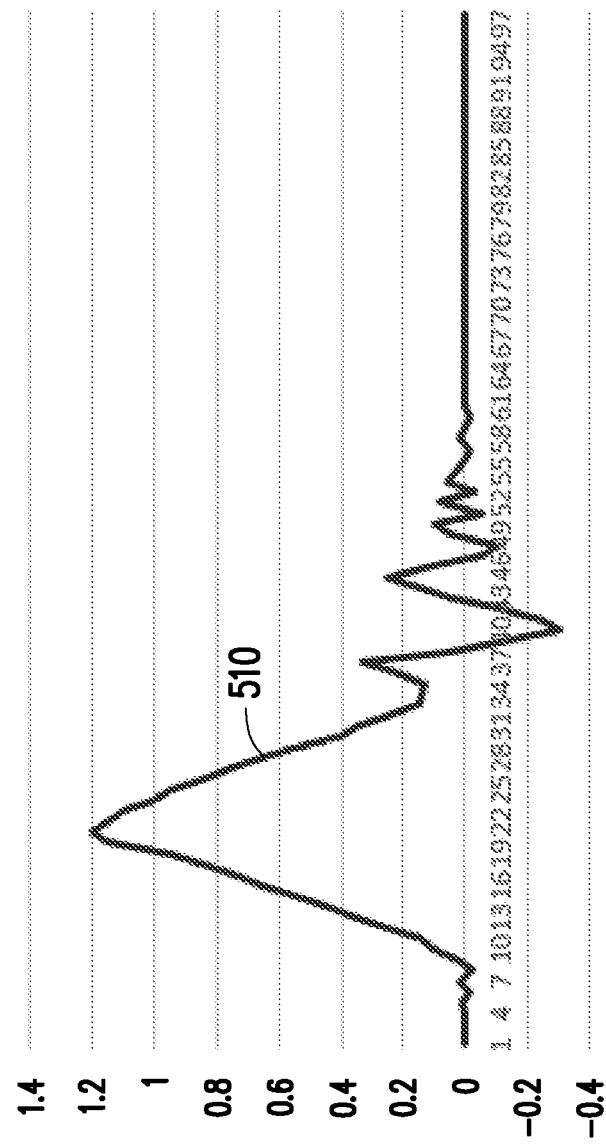
FIG. 5 is an example illustrating detection values of the accelerometer influenced by a motion of haptic feedback elements.

For example, FIG. 4 is an example illustrating detection values of the accelerometer 211 of FIG. 2A. Referring to FIG. 4, all of the detection values of the accelerometer 211 are close to zero. FIG. 5 is an example illustrating detection values of the accelerometer 211 of FIG. 2A influenced by a motion of haptic feedback elements 135. Referring to FIG. 5, the maximum of the detection values of the accelerometer 211 reaches 1.2. The processor 150 can determine the influenced value as 1.2 according to the lookup table with the content of the haptic feedback command, and make the detection value of the accelerometer 211 plus the compensating value (i.e., −1.2). Accordingly, the influence of the accelerometer 211 from the vibration of the haptic feedback elements 135 can be reduced.

Figure 6:
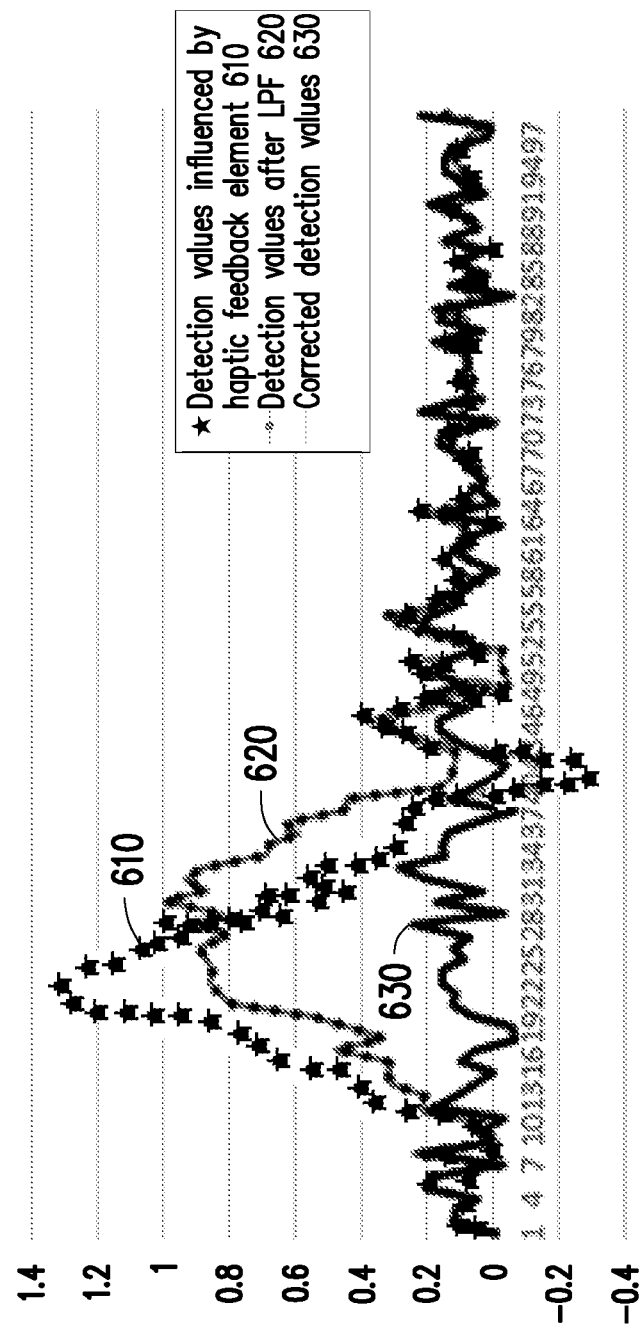
FIG. 6 is an example illustrating detection values of the accelerometer influenced by a motion of haptic feedback elements, filtered by a low pass filter (LPF), and corrected by machine learning.

For another example, FIG. 6 is an example illustrating detection values of the accelerometer 211 of FIG. 2A influenced by a motion of the haptic feedback elements 135, filtered by a low pass filter (LPF), and corrected by compensating values. Referring to FIG. 6, comparing with detection values 610 and 620, the maximum of the detection values 620 filtered by the LPF is lower than the detection values 610.

In another embodiment, the processor 150 may filter the value influenced by the motion of the haptic feedback elements 135 from the detection value with a range, and the influenced value are determined as outside of the range. Specifically, according to different contents of the haptic feedback command and different types of the haptic feedback elements 135, the processor 150 may set different range to filter the detection value of the motion sensor 110, wherein values outside of the range would be considered as the influenced values and would be filtered.

Figure 7:
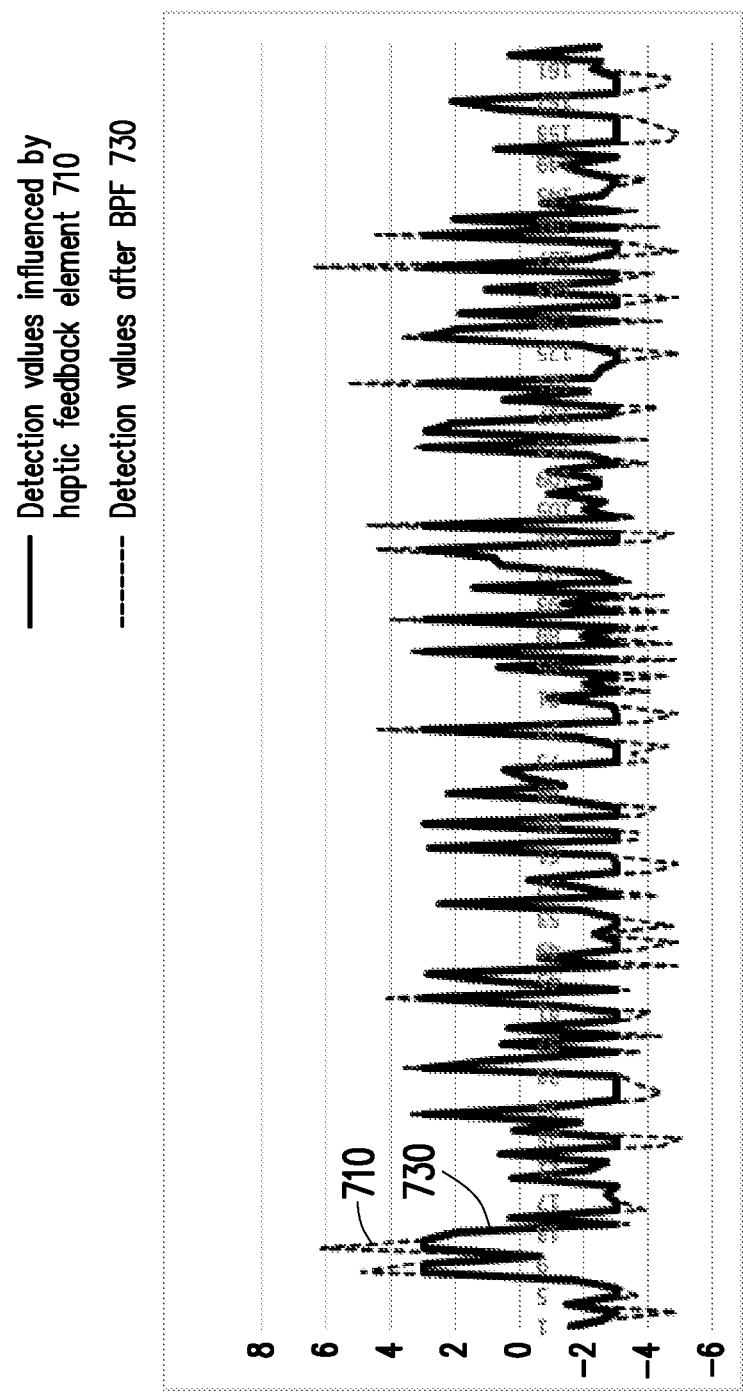
FIG. 7 is an example illustrating detection values of the accelerometer influenced by haptic feedback elements and filtered by a band pass filter (BPF).

For example, FIG. 7 is an example illustrating detection values of the accelerometer influenced by a motion of haptic feedback elements and filtered by a band pass filter (BPF). Referring to FIG. 7, it is assumed that values outside of a range −3 to 3 is influenced by the haptic feedback elements 135, and the BPF is designed according to the range −3 to 3. Comparing with detection values 710 and 730, detection values 710 outside of the range would be filtered to form the detection values 730.

It should be noticed that, the accelerometer is merely one example of inertial sensors for FIGS. 4-7. The accelerometer can also be replaced by the gyroscope or other inertial sensors.

In one embodiment, the processor 150 may determine a compensating value for the detection value from the motion sensor 110 through a compensating model, wherein the compensating model is established by machine learning technology. The processor 150 uses different known haptic feedback commands and influenced values as training samples, to establish a model or a classifier through the machine learning technology (such as deep learning, artificial neural network (ANN), or support vector machine (SVM), etc.). During the training of the model or classifier, for example, a current output of the compensating value from the model or classifier would be compared with a correct compensating value. If a difference between the current output of the model or classifier and the correct compensation value is less than a threshold, higher scores would be given corresponding to the suitable compensating value currently outputted from the model or classifier. If the difference between the current output of the model or classifier and the correct compensation value is larger than the threshold, lower scores would be given corresponding to the wrong compensating value currently outputted from the model or classifier. The model or the classifier records relations among the haptic feedback commands and influenced values, and could be used for determining the influenced values. Accordingly, the influenced values can be estimated more precise.

In one embodiment, the processor 150 may modify the detection value from the motion sensor 110 according to an average value of multiple detection values. For example, the processor 150 make an average value of previously k detection values replace the (k+1)-th detection value, wherein k is a positive integer, so as to reduce the influence caused from instant variation of the detection values. Alternatively, the processor 150 may use previous estimated compensating value and currently obtained detection value from the motion sensor 110, to obtain current estimated influenced value through the Kalman filter.

It should be noticed that, aforementioned embodiments focuses on modifying the detection values of the motion sensor. However, in other embodiments, the position information can be modified directly according to the haptic feedback command. The motion of the haptic feedback elements 135 is based on the haptic feedback command and has corresponding relation with the positioning information of the haptic feedback device 130. The haptic feedback elements 135 would be triggered by each haptic feedback command, and a corresponding variation (such as displacement, rotation, etc.) of the positioning information of the haptic feedback device 130 can be measured and recorded, to establish a lookup table, a function, a filter or a compensating model. Then, the processor 150 can use the lookup table, the function, the filter or the compensating model to determine compensation value of the positioning information, and the positioning information can be modified according to the compensation value.

In addition, whenever receiving detection values from the motion sensor 110, the processor 150 would modify the positioning information of the haptic feedback device 130 while performing the haptic feedback command, to reduce the influence from the haptic feedback elements 135 dynamically. Then, in response to a termination of the haptic feedback command, the processor 150 would stop modifying the position information of the haptic feedback device 130, i.e. a termination of the compensating mechanism. The compensating mechanism would be activated when the haptic feedback elements 135 are triggered by a next haptic feedback command.

On the other hand, according to different implementing scenarios, the motion detection systems 100, 200 and 250 may include a plurality of haptic feedback devices 130 (such as a steering wheel, a light gun, a rhythm game controller, a fishing rod, etc.). Taking two haptic feedback devices 130 as an example, the two haptic feedback devices 130 are called a first haptic feedback device and a second haptic feedback device. The haptic feedback elements 135 embedded in the first and second haptic feedback devices can be triggered by the haptic feedback command to perform the haptic feedback, such as force feedback, vibration, shake, etc.

Figure 8:
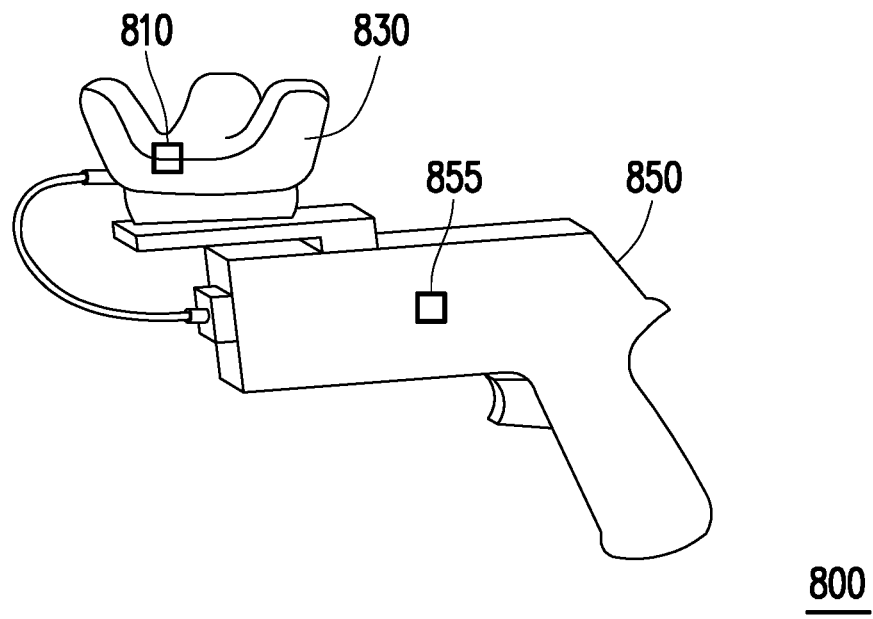
FIG. 8 is a schematic diagram illustrating a motion detection system according to one of the exemplary embodiments of the disclosure.

It should be noticed that, the second haptic feedback device might not be equipped with the motion sensor 110. In order to track the motion of the second haptic feedback device, the second haptic feedback device can be equipped with a tracker including the motion sensor 110. The detection values from the motion sensor 110 of the tracker can be transmitted to the processor 150, so as to determine a position of the second haptic feedback device. For example, FIG. 8 is a schematic diagram illustrating a motion detection system 800 according to one of the exemplary embodiments of the disclosure. Referring to FIG. 8, the motion detection system 800 includes a tracker 830 and a light gun 850 (i.e., the second haptic feedback device) mounted with the tracker 830. The tracker 830 includes the motion sensor 810 (e.g., an accelerometer, an IR sensor, etc.), and the light gun 850 includes one or more second haptic feedback elements 855. Accordingly, the motion sensor 135 can detect the motion of the light gun 850.

Figure 9:
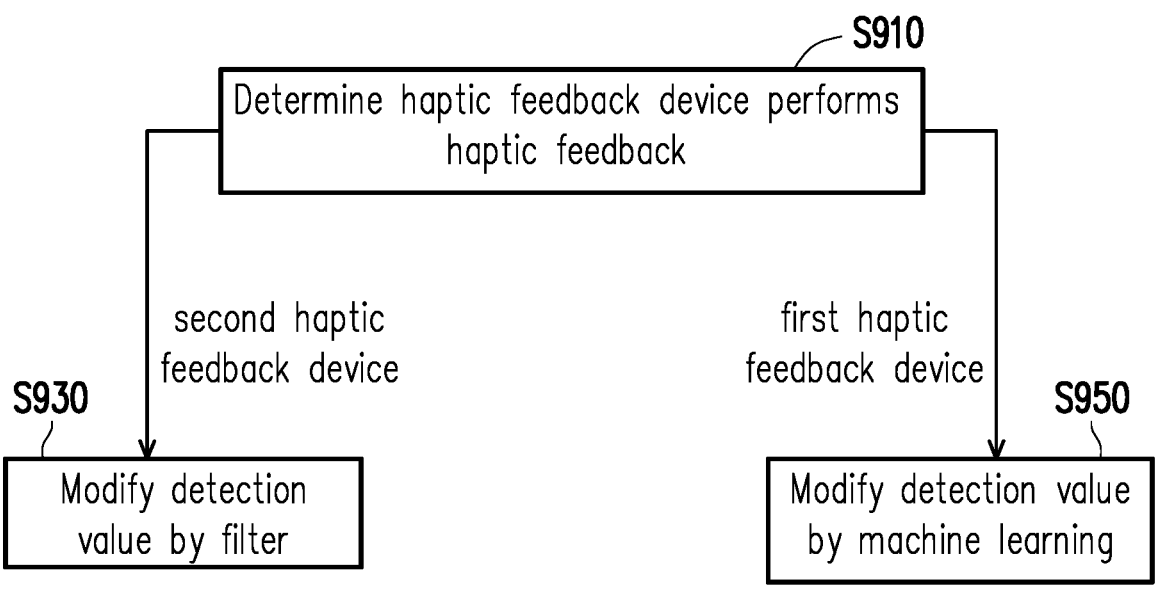
FIG. 9 is a flowchart illustrating a motion detection method for different haptic feedback elements according to one of the exemplary embodiments of the disclosure.

Regarding different haptic feedback devices, referring to FIG. 9, the processor 150 may determine at least one of haptic feedback devices performs the haptic feedback (Step S910). There are two compensating mechanism used for compensating the detection values influenced by the motions of the haptic feedback elements 135 and the second haptic feedback elements 855, respectively. The light gun 850 or other outer accessories is mounted with the tracker 830 by user, and there is no default compensating mechanism for these outer accessories. A corresponding compensating value can not be obtained directly by the lookup table or default function. Therefore, the determination of step S910 should be performed, to eliminate an influence caused by any haptic feedback element. In response to the second haptic feedback elements 855 being triggered by the haptic feedback command, the processor 150 may modify the detection value from the motion sensor 810 of the tracker 830 by filter (Step S930). The filter is set with a range as described above.

It should be noticed that, the time to filter the detection value from the motion sensor 810 or the position information would be determined according to a communication between communication interface (such as pogo pins, etc.) and the processor 150. For example, pogo pins would be disposed on the tracker 830 to connect with the second haptic feedback device (e.g., light gun 850), so that signals can be transmitted between two devices. In addition, in response to the combination of tracker 830 and the light gun 850 by pogo pins, the light gun 850 can communicate with the processor 150 through the tracker 830. Alternatively, if the light gun 850 has a communication transceiver (supporting Wi-Fi, Bluetooth, USB, etc.), the light gun 850 can communicate with the processor 150 directly. Accordingly, in response to the second haptic feedback elements 855 being triggered by the haptic feedback command, the light gun 850 can inform the processor 150 directly or inform the processor 150 though the tracker 830 according to the configuration and detection of voltage level of signal between the tracker 830 and the light gun 850. Then, the processor 150 would know the time when the second haptic feedback device performs the haptic feedback, and the compensating mechanism can be activated for second haptic feedback device.

On the other hand, in response to the haptic feedback elements 135 being triggered by the haptic feedback command, the processor 150 may modify the position information by a machine learning technology (Step S950). The processor 150 use the compensating model as described above to determine the compensation value of the position information. In addition, if both haptic feedback elements 135 and second haptic feedback elements 855 being triggered by the haptic feedback command (i.e., the first and second haptic feedback device perform the haptic feedback at same time), the processor 150 may use the machine learning manner to modify the detection value.

It should be noticed that, in other embodiments, the modify manner (such as filter, machine learning, etc.) would be modified based on actual requirement. For example, the lookup table manner is used for the haptic feedback elements 135, and the average of multiple detection values is used for the second haptic feedback elements 855. Alternatively, the modify manner for the haptic feedback elements 135 and the second haptic feedback elements 855 could be the same.

The disclosure also provides a non-transitory computer readable recording medium, which records computer program to be loaded into a processor to execute the steps of the proposed method. The computer program is composed of a plurality of program instructions (e.g. an organization chart, establishing program instruction, a table approving program instruction, a setting program instruction, and a deployment program instruction). Once the program sections are loaded into the processor and executed by the same, the steps of the proposed motion detection method would be accomplished.

In summary, the exemplary embodiments described above depicted a motion detection system, a motion detection method and a computer-readable recording medium thereof. The motion of the haptic feedback elements would affect the positioning information of the haptic feedback device. In the exemplary embodiments, the influence from the haptic feedback elements would be estimated and eliminated by a filter, a lookup table, a machine learning technology, etc. Accordingly, a better positioning result would be obtained. In addition, if the haptic feedback device is equipped with an inner haptic feedback element (i.e. the haptic feedback elements as described above) and an outer haptic feedback element (i.e. the second haptic feedback elements as described above), different compensating mechanisms would be applied on the positioning information.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A motion detection system, comprising:
   one or more haptic feedback devices, comprised one or more haptic feedback elements, wherein the haptic feedback elements are configured to perform a haptic feedback; and
   a motion sensor;
   wherein the haptic feedback elements are triggered to perform the haptic feedback according to a haptic feedback command, a detection value of the motion sensor is obtained in response to the haptic feedback elements being triggered by the haptic feedback command, and a modified detection value of the motion sensor is determined according to the detection value and motion of the haptic feedback elements, and positioning information of the haptic feedback devices is modified according to the modified detection value of the motion sensor, wherein the positioning information is related to a position in a space.

2. The motion detection system according to claim 1, wherein the detection value is modified according to a compensating command, and the compensating command is used for indicating a modification of the detection value corresponding to a content of the haptic feedback command.

3. The motion detection system according to claim 2, wherein the compensating command comprises a compensating value for modifying the detection value, and the compensating value is determined according to a lookup table, wherein the lookup table records a relation between the compensating value and the content of the haptic feedback command.

4. The motion detection system according to claim 2, wherein the compensating command comprises a compensating value for compensating the detection value, and the compensating value is determined by a compensating model, wherein the compensating model is established by a machine learning technology.

5. The motion detection system according to claim 1, wherein at least one value influenced by motion of the haptic feedback elements is filtered from the detection value with a range so as to modify the detection value.

6. The motion detection system according to claim 1, wherein the haptic feedback devices comprise the motion sensor, and the motion sensor comprises an inertial sensor, and an output of the inertial sensor is modified in response to the haptic feedback elements being triggered by the haptic feedback command so as to modify the detection value.

7. The motion detection system according to claim 1, wherein the haptic feedback devices comprise a first haptic feedback device and a second haptic feedback device, and the motion detection system further comprising:
a processor, configured for:
determining at least one of the first haptic feedback device and the second haptic feedback device to perform the haptic feedback, wherein
the detection value from the motion sensor is modified by a filter in response to a determination that the second haptic feedback device performs the haptic feedback; and
the detection value from the motion sensor is modified by a machine learning model or a compensating command in response to a determination that the first haptic feedback device performs the haptic feedback.

8. The motion detection system according to claim 1, further comprising:
a processor, generating the haptic feedback command and accordingly performing a modification to modify the detection value.

9. The motion detection system according to claim 8, wherein the processor is independent from the haptic feedback devices and modifies the detection value received from the motion sensor according to a compensating command or the processor is mounted in the haptic feedback devices.

10. The motion detection system according to claim 1, wherein the motion sensor comprises an accelerometer, and an output of the accelerometer is modified in response to the haptic feedback elements being triggered by the haptic feedback command so as to modify the detection value.

11. A motion detection method, adapted for a motion detection system comprising, and the motion detection method comprising:
triggering one or more haptic feedback devices of the motion detection system to perform a haptic feedback according to a haptic feedback command;
obtaining a detection value of a motion sensor of the motion detection system in response to the haptic feedback devices being triggered by the haptic feedback command;
determining a modified detection value of the motion sensor according to the detection value and motion of the one or more haptic feedback devices; and
modifying positioning information of the haptic feedback devices according to the modified detection value of the motion sensor, wherein the positioning information is related to a position in a space.

12. The motion detection method according to claim 11, wherein the step of determining the modified detection value of the motion sensor comprises:

modifying the detection value according to a compensating command, wherein the compensating command is used for indicating a modification of the detection value corresponding to a content of the haptic feedback command.

13. The motion detection method according to claim 12, wherein the compensating command comprises a compensating value for modifying the detection value, and the compensating value is determined according to a lookup table, wherein the lookup table records a relation between the compensating value and the content of the haptic feedback command.

14. The motion detection method according to claim 12, wherein the compensating command comprises a compensating value for compensating the detection value, and the compensating value is determined by a compensating model, wherein the compensating model is established by a machine learning technology.

15. The motion detection method according to claim 11, wherein the step of determining the modified detection value of the motion sensor comprises:
filtering at least one value influenced by motion of the haptic feedback devices from the detection value with a range so as to modify the detection value.

16. The motion detection method according to claim 11, wherein the motion sensor comprises an inertial sensor, and the step of determining the modified detection value of the motion sensor comprises:
modifying an output of the inertial sensor in response to the haptic feedback devices being triggered by the haptic feedback command so as to modify the detection value.

17. The motion detection method according to claim 11, wherein the haptic feedback devices comprises a first haptic feedback device and a second haptic feedback device, and the step of determining the modified detection value of the motion sensor comprises:
determining at least one of the first haptic feedback device and the second haptic feedback device to perform the haptic feedback;
modifying the detection value from the motion sensor by a filter in response to a determination that the second haptic feedback device performs the haptic feedback; and
modifying the detection value from the motion sensor by a machine learning technology or a compensating command in response to a determination that the first haptic feedback device performs the haptic feedback.

18. The motion detection method according to claim 11, wherein the detection value is generated by an accelerometer of the motion sensor, and the step of determining the modified detection value of the motion sensor comprises:
modifying an output of the accelerometer in response the haptic feedback elements being triggered by the haptic feedback command so as to modify the detection value.

19. The motion detection method according to claim 11, wherein the motion detection system comprises a processor, and the motion detection method further comprises:
generating, by the processor, the haptic feedback command; wherein
the step of modifying the detection value from the motion sensor comprises:
performing, by the processor, a modification to modify the detection value.

20. A non-transitory computer readable recording medium, recording computer program to be loaded by a processor to execute steps of:

triggering one or more haptic feedback devices of a motion detection system to perform a haptic feedback according to a haptic feedback command;

obtaining a detection value of a motion sensor of the motion detection system in response to the haptic feedback devices being triggered by the haptic feedback command;

determining a modified detection value of the motion sensor according to the detection value and motion of the one or more haptic feedback devices; and modifying positioning information of the haptic feedback devices according to the modified detection value of the motion sensor, wherein the positioning information is related to a position in a space.

\* \* \* \* \*